(12) United States Patent
Pinnavaia et al.

(10) Patent No.: US 7,166,265 B2
(45) Date of Patent: *Jan. 23, 2007

(54) PROCESS FOR THE ASSEMBLY OF ULTRASTABLE MESOSTRUCTURED ORGANOFUNCTIONAL SILICA COMPOSITIONS

(75) Inventors: Thomas J. Pinnavaia, East Lansing, MI (US); Jainisha R. Shah, East Lansing, MI (US); Seong-Su Kim, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 444 days.

This patent is subject to a terminal disclaimer.

(21) Appl. No.: 10/718,329

(22) Filed: Nov. 20, 2003

(65) Prior Publication Data

US 2004/0229751 A1 Nov. 18, 2004

Related U.S. Application Data

(60) Provisional application No. 60/429,693, filed on Nov. 27, 2002.

(51) Int. Cl.
*C01B 33/26* (2006.01)
*C01B 33/12* (2006.01)
*B01J 31/00* (2006.01)

(52) U.S. Cl. .............. 423/328.1; 423/328.2; 423/335; 423/702; 423/709; 502/158; 502/527.24

(58) Field of Classification Search ............. 502/158, 502/527.24; 423/328.1, 328.2, 335, 702, 423/709

See application file for complete search history.

(56) References Cited

U.S. PATENT DOCUMENTS

| | | | |
|---|---|---|---|
| 6,284,696 B1 | 9/2001 | Koya et al. | 502/64 |
| 6,506,485 B1 * | 1/2003 | Pinnavaia et al. | 428/312.6 |
| 6,528,034 B1 * | 3/2003 | Pinnavaia et al. | 423/335 |
| 6,585,952 B1 | 7/2003 | Pinnavaia et al. | 423/702 |
| 6,607,705 B1 | 8/2003 | Pinnavaia et al. | 423/328.2 |
| 6,641,657 B1 * | 11/2003 | Pinnavaia et al. | 106/601 |
| 6,713,643 B1 * | 3/2004 | Pinnavaia et al. | 556/450 |
| 6,800,266 B1 * | 10/2004 | Pinnavaia et al. | 423/328.1 |
| 6,946,109 B1 * | 9/2005 | Pinnavaia et al. | 423/335 |
| 6,977,065 B1 * | 12/2005 | Esch et al. | 423/335 |

FOREIGN PATENT DOCUMENTS

WO    WO 01/83370 A2 * 11/2001

OTHER PUBLICATIONS

Wight, A. O. et al., Chem. Rev. 102 3589-3613 (2002).
Stein, A., Adv. Mater. 15 763-775 (2003).
Burkett, S.L., et al., Chem. Commun. 1367-1368 (1996).
Feng, X., et al., Science 276 923-926 (1997).
Mann, S.B., et al., Chem. Mat. 11 2300-2310 (1997).
Margolese, D., et al., Chem. Mat. 12 2448-2459 (2000).
Markowitz, M. A., et al., J. Phys. Chem. B 104 10820-10826 (2000).
Brown, J., et al., Chem. Commun. 69-70 (1999).
Mercier, L., et al., Chem. Mat. 12 188-196 (2000).
Richer, R., et al., Chem. Commun. 1775-1776 (1998).
Stein, A., et al., Adv. Mater. 12 1403-1419 (2000).
Brown, J., et al., Microporous Mesoporous Mat. 37 41-48 (2000).
Yoshitake, H., et al., Chem. Mat. 14 4603-4610 (2002).
Yiu, H. H. P., et al., J. Mol. Catal. B-Enzym. 15 81-92 (2001).
Walcarius, A., et al., Chem. Mat. 15 2161-2173 (2003).
Mori, Y., et al., Chem. Mat. 13 2173-2178 (2001).
Kruk, M., et al., Studies in Surface Science and Catalysis 141 197-204 (2002).
Schmidt-Winkel et al in J. Am. Chem. Soc. 121 254-255 (1999).
Schmidt-Winkel et al, Chem. Materials 12 686-696 (2000).
Sing, et al., Pure Appl. Chem. 57 603-619 (1985).

* cited by examiner

*Primary Examiner*—J. A. Lorengo
*Assistant Examiner*—J. Pasterczyk
(74) *Attorney, Agent, or Firm*—Ian C. McLeod; Steven E. Merritt

(57) ABSTRACT

A process for the preparation of mesostructured organofunctional silica and silica-alumina compositions using a hydrolyzable organosilane compound is described. The process uses a water soluble silicate to form the compositions, which have hexagonal, wormhole or foam mesostructures. The compositions are useful for catalytic and sorption applications.

37 Claims, No Drawings

PROCESS FOR THE ASSEMBLY OF ULTRASTABLE MESOSTRUCTURED ORGANOFUNCTIONAL SILICA COMPOSITIONS

CROSS-REFERENCE TO RELATED APPLICATIONS

This application claims priority to Provisional Application Ser. No. 60/429,693, filed Nov. 27, 2002.

STATEMENT REGARDING FEDERALLY SPONSORED RESEARCH OR DEVELOPMENT

Not Applicable.

REFERENCE TO A "COMPUTER LISTING APPENDIX SUBMITTED ON A COMPACT DISC"

Not Applicable.

BACKGROUND OF THE INVENTION

Field of the Invention

The present invention relates to a process for organofunctional silica and silica alumina compositions derived from a water soluble silicate. In particular, the present invention provides such compositions by reaction of the silicate with a hydrolyzable organic silane.

Mesostructured organofunctional silicas with the anhydrous composition $(SiO_2)_{1-x}(SiLO_{1.5})_x$, where L is the desired organo group, exhibit exceptional activity, and selectivity in a number of catalytic reactions and sorption processes (Wight, A. P. et al., Chem. Rev. 102 3589–3613 (2002); Stein, A., Adv. Mater. 15 763–775 (2003)). Two general synthetic pathways have been developed for the synthesis of these materials, namely, (I) the post-synthesis grafting of organosilane reagents onto the pore walls of a pre-assembled mesostructure through coupling reactions with surface silanol groups, and (ii) the direct assembly of $SiO_4$ and $SiLO_3$ units, into a mesostructured framework in the presence of a structure-directing surfactant porogen. Both synthetic approaches have been used to prepare hexagonal (Burkett, S. L., et al, Chem. Commun. 1367–1368 (1996); Feng, X., et al., Science 276 923–926 (1997); Mann, S. B., et al., Chem. Mat. 11 2300–2310 (1997)) structure types (Margolese, D., et al., Chem. Mat. 12 2448–2459 (2000); Markowitz, M. A., et al., J. Phys. Chem. B 104 10820–10826 (2000)) as well as wormhole (Brown, J., et al., Chem. Commun. 69–70 (1999); Mercier, L., et al., Chem. Mat. 12 188–196 (2000)) framework structures (Richer, R., et al., Chem. Commun. 1775–1776 (1998); Stein, A., et al., Adv. Mater. 12 1403–1419 (2000)). Organo groups incorporated into the mesostructures have included thio groups for the trapping of mercury and other heavy metals (Brown, J., et al., Microporous Mesoporous Mat. 37 41–48 (2000); Brown, J., et al., Chem. Commun. 69–70 (1999)) amine groups for based catalyzed reactions and the trapping of the arsenate ions (Yoshitake, H., et al., Chem. Mat. 14 4603–4610 (2002)), carboxylic acid group for the immobilization of biological molecules (Yiu, H. H. P., et al., J. Mol. Catal. B-Enzym. 15 81–92 (2001)) among others.

In general, the direct assembly route to organofunctional mesostructures is preferred over he grafting pathway, in part, because it minimizes processing steps and allows for a more uniform distribution of organo groups fully integrated into the framework walls (Walcarius, A., et al., Chem. Mat. 15 2161–2173 (2003)). In addition, the direct assembly route generally provides ultrastable mesostructures with higher loading of organo groups without collapsing the framework pores (Mori, Y., et al., Chem. Mat. 13 2173–2178 (2001); Kruk, M., et al., Studies in Surface Science and Catalysis 141 197–204 (2002)). As the materials applications of the functionalized $(SiO_2)_{1-x}(SiLO_{1.5})_x$ materials becomes more widespread, it becomes increasingly important to develop a cost effective direct assembly route to their synthesis. However, all of the previously reported direct assembly routes to these compositions have used silicon alkoxides, most notably, tetraethylorthosilicate (TEOS), as the precursor to the $SiO_4$ framework subunits, along with organosilicon alkoxides as the source of the $SiLO_3$ units. Thus, the use of silicon alkoxides as the source of $SiO_4$ units for the direct assembly of mesostructured organofunctional silicas represents a significant cost disadvantage that limits the practical applications of these useful compositions. U.S. Pat. No. 6,284,696 B1 to Kreger et al describes the conventional process for synthesis of organofunctional silicates and other metal oxides. There is a need for an improved process.

OBJECTS

It is an object of the present invention to provide an improved process for the direct assembly of ultrastable mesotructured organofunctional silica and silica alumina oxide compositions. It is further an object of the present invention to provide a process which is economical to perform. These and other objects will become increasingly apparent by reference to the following description and the drawings.

SUMMARY OF THE INVENTION

The present invention provides a process for producing a mesostructured organofunctional silica composition with an anhydrous formula $(SiO_2)_{1-x}(SiLO_{1.5})_x$, wherein L is one or more organo groups linked to the framework silicon centers through a carbon-silicon bond and x is a fraction of the framework silicon centers that are organofunctional, comprising the steps of combining a basic aqueous solution of silicate anions with an acidified solution of at least one hydrolyzable organosilane reagent and a surfactant to form a reaction mixture with a pH between about 1.0 and about 10, aging the reaction mixture at a temperature between 0° and 150° C. at a surfactant to silicon ratio effective to produce a mesostructured organofunctional silica composition intercalated by the surfactant and removing the surfactant from the intercalated product by solvent extraction.

Preferably the hydrolyzable organosilane reagent used to produce the mesostructured organo silica composition has the formula $LSiY_3$, wherein L is the organofunctional group and Y is a hydrolyzable moiety selected from the group consisting of halides and alkoxides. Preferably the organofunctional group L of the mesostuctured organofunctional silica composition contains one or more heteroatoms selected from the group comprising oxygen, nitrogen, sulfur, phosphorus, boron, and a halogen, and combinations thereof. Preferably anhydrous formula $(SiO_2)_{1-x}(LSiO_{1.5})_x$ for the mesostructured organofunctional silica composition has a value of x=0.01 to 0.65, corresponding to the fraction of framework silicon centers linked through carbon-silicon covalent bonds to one or more organo groups. Preferably the mesostructured organofunctional silica composition has a hexagonal, wormhole, or mesocellular foam framework structure. Preferably wherein the solvent used to extract the intercalated surfactant is an alcohol, which can optionally contain a protonic acid. Preferably the surfactant is selected from the group consisting of an alkyl amine, a cationic quaternary ammonium ion, a non-ionic diblock polymer, a non-ionic triblock polymer, and a saccharide-based polymer.

The present invention also relates to a process for the production of an organofunctional silica with a mesocellular foam structure with framework silicon centers and an anhydrous formula $(SiO_2)_{1-x}(LSiO_{1.5})_x$, wherein L represents one or more organo groups linked to the framework silicon centers through a carbon-silicon bond and x is a fraction of the framework silicon centers that are organofunctional, comprising the steps of combining a basic aqueous solution of silicate anions with a solution containing a surfactant, an emulsifying agent, and at least one hydrolyzable organosilane reagent in an acidified non-aqueous polar solvent, wherein a dielectric constant of the non-aqueous solvent is greater than about 70 at 25° C., to obtain a reaction mixture as an emulsion with a pH between 1 to 10, allowing the reaction mixture to age at temperature between 0° and 150° C. effective to produce an organofunctional mesocellular silica foam composition intercalated by the surfactant, and removing the surfactant from the intercalated product by solvent extraction. Preferably the hydrolyzable organosilane reagent used to produce the organofunctional mesocellular foam silica composition has the formula $LSiY_3$ where L is the organofunctional group and Y is a hydrolyzable moiety selected from the group consisting of halide and alkoxide. Preferably the organofunctional group of the organofunctional mesocellular silica foam composition contains one or more heteroatoms selected from the group consisting of oxygen, nitrogen, sulfur, phosphorus, boron, and a halogen, and combinations thereof. Preferably the anhydrous formula $(SiO_2)_{1-x}(LSiO_{1.5})_x$ for the organofunctional mesocellular silica foam composition has a value of x–0.01 to 0.30, corresponding to the fraction of the framework silicon centers linked through carbon-silicon covalent bonds to one or more organo groups. Preferably the solvent used to extract the intercalated surfactant is an alcohol which can optionally contain a protonic acid. Preferably the surfactant is selected from the group consisting of a non-ionic diblock polymer, a non-ionic triblock polymer, and a saccharide-based polymer. Preferably the emulsifying agent is 1,3,5,-trimethylbenzene. Preferably the emulsifying agent is selected from the group consisting of mono- and poly-alkylated benzenes and alcohols with 8 or more carbon atoms. Preferably the non-aqueous polar solvent is formamide which can optionally contain an acid.

The present invention also provides a method for the production of a mesostructured organofunctional silica-alumina composition with framework silicon centers with an anhydrous formula $(SiO_2)_{1-x}(LSiO_{1.5})_x(Al_2O_3)_y$, wherein L represents one or more organo groups linked to the framework silicon centers through a carbon-silicon bond, x is the fraction of framework silicon centers that are organofunctional, and y is the number of $AlO_4$ and $AlO_6$ units that are linked to the framework $SiO_4$ and $LSiO_3$ units, comprising the steps of combining a basic aqueous solution of silicate and aluminate ions, hydroxide ions as a base, zeolite-directing counter cations, and at least one hydrolyzable organosilane reagent, aging the solution at or above ambient temperature for a period effective to produce protozeolitic aluminosilicate clusters in solution, reducing the pH of the mixture to a value of 10 or below through the incorporation of an acid, adding a surfactant to form a reaction mixture, aging the reaction mixture at a pH between about 1.0 and about 10 at a temperature between 0° and 150° C. at a surfactant to silicon ratio effective to produce a mesostructured organofunctional silica-alumina composition intercalated by the surfactant and removing the surfactant from the intercalated product by solvent extraction. Preferably the hydrolyzable organosilane reagent used to produce the mesostructured organo silica-alumina composition has the formula $LSiY_3$, wherein L is the organofunctional group and Y is a hydrolyzable moiety selected from the group consisting of halide and alkoxide. Preferably the mesostructured organofunctional silica-alumina composition has the anhydrous empirical formula $(SiO_2)_{1-x}(LSiO_{1.5})_x(Al_2O_3)_y$, where L is one or more organofunctional group linked to the framework silicon centers through a carbon-silicon covalent bond, x=0.01 to 0.65 and y=0.005 to 0.50. Preferably the organofunctional group L of the mesostructured organofunctional silica-alumina composition contains one or more heteroatoms selected from the group consisting of oxygen, nitrogen, sulfur, phosphorus, boron, and a halogen, and combinations thereof. Preferably the framework structure of the mesostructured organofunctional silica-alumina composition is hexagonal or wormhole. Preferably the solvent used to extract the intercalated surfactant is an alcohol which optionally contains a protonic acid. Preferably the surfactant used to produce the mesostructured organofunctional silica-alumina composition is selected from the group consisting of an alkyl amine, a cationic quaternary ammonium ion, a non-ionic diblock polymer, a non-ionic triblock polymer, and a saccharide-based polymer.

The present invention further provides a process for producing an organofunctional mesocellular silica-alumina foam composition with an anhydrous empirical formula $(SiO_2)_{1-x}(LSiO_{1.5})_x(Al_2O_3)_y$, wherein L represents one or more organofunctional groups linked to the framework silicon centers trough a carbon-silicon covalent bond and wherein x=0.01 to 0.30, and y=0.005 to 0.05, comprising the steps of forming a basic aluminosilicate solution from silicate anions, aluminate anions, and a zeolite-directing counter-cation in the minimum amount of water, aging the solution at a temperature effective to form protozeolitic nanoclusters in the solution, adding an organosilane reagent as a source of $LSiO_3$ units, aging the solution further to incorporate the $LSiO_3$ units into the protozeolitic nanoclusters, combing the resulting solution with an emulsion containing a surfactant, an emulsifying agent, and sulfuric acid effective in neutralizing the formal hydroxide ion content of the protozeolitic aluminosilicate solution to form a reaction mixture, lowering the pH of the reaction mixture to a value between about 1.0 and about 5.5, aging the reaction at a temperature between 0° to 150° C. for a period of time effective to form a mesocellular foam structure intercalated by the surfactant and emulsifying agent, and removing the surfactant and emulsifying agent by solvent extraction. Preferably the organofunctional group L of the mesocellular silica-alumina foam composition contains one or more heteroatoms selected from the group consisting of oxygen, nitrogen, sulfur, phosphorus, boron, and a halogen, and combinations thereof. Preferably the surfactant is a non-ionic ethylene oxide-propylene oxide triblock surfactant of the type PEO-PPO-PEO. Preferably the surfactant is the triblock surfactant PLURONIC 123. Preferably the zeolite-directing counter cation used to form the protozeolitic aluminosilicate nanoclusters is selected from the group comprising alkali metal ions and quaternary ammonium ions. Preferably the zeolite-directing counter cation used to form the protozeolitic aluminosilicate nanoclusters is sodium. Preferably the organosilane for use as a precursor to the $LSiO_3$ framework units has the formula $LSiY_3$, wherein Y is a hydrolyzable moiety selected from the group consisting of a halide and alkoxide moiety and L is the organo functional group bonded to silicon through a carbon silicon bond. Preferably the emulsifying agent is selected from the group consisting of trialkylated benzenes and alkanes and alkyl alcohols containing eight or more carbon atoms. Preferably 1,3,5-trimethylbenzene is the emulsifying agent.

The present invention relates to an organofunctional silica composition with a mesocellular foam framework structure and an anhydrous formula $(SiO_2)_{1-x}(LSiO_{1.5})_x$, wherein L represents one or more organo groups linked to framework silicon centers through a carbon-silicon bond and wherein $x=0.01$ to $0.30$ is a fraction of framework silicon centers that are organofunctional. The present invention relates to mesostructured organofunctional silica-alumina composition with an anhydrous formula $(SiO_2)_{1-x}(LSiO_{1.5})_x(Al_2O_3)_y$, wherein L represents one or more organo groups linked to the framework silicon centers through a carbon-silicon bond, $x=0.01$ to $0.65$ is the fraction of the framework silicon centers that are organofunctional, and $y=0.005$ to $0.50$ is number of $AlO_4$ and $AlO_6$ units that are linked to framework $SiO_4$ and $LSiO_3$ units and wherein the framework structure is hexagonal or wormhole. The present invention relates to an organofunctional mesocellular silica-alumina foam composition with framework silicon centers, with an anhydrous empirical formula $(SiO_2)_{1-x}(LSiO_{1.5})_x$, wherein L represents one or more organofunctional groups linked to the framework silicon centers through a carbon-silicon covalent bond and wherein $x=0.01$ to $0.30$, and $y=0.005$ to $0.05$. The organo group L is comprised of carbon and hydrogen only. The organo group L is comprised of carbon, hydrogen and one or more heteroatoms selected from the group consisting of boron, nitrogen, phosphorus, oxygen, sulfur, and halogen, and combinations thereof.

DESCRIPTION OF PREFERRED EMBODIMENTS

The present invention is to provide a cost savings method for the supramolecular surfactant-directed assembly of an ultrastable mesostructured organofunctional silica composition through the use of commercially available water soluble silicate anions as the silica source. The present invention also provides for a supramolecular surfactant-directed assembly method for the production of the first examples of an organofunctional silica composition with an ultrastable mesocellular foam structure through the use of an aqueous silicate solution as the source of the framework $SiO_4$ units in the framework walls.

The present invention also provides a method for the supramolecular surfactant-directed assembly of the first examples of an ultrastable mesostuctured organofunctional silica-alumina composition through the use of commercially available aqueous solutions of silicate anions as the silica source and aluminate ion as the alumina source. The silicate and aluminate ions are aged in basic solution prior to mesostructure assembly in order to form protozeolitic nanoclusters. The said nanoclusters are subsequently converted to new mesostructured organofunctional silica-alumina materials wherein the anhydrous composition is $(SiO_2)_{1-x}(LSiO_{1.5})_x(Al_2O_3)_y$, and wherein L is an organofunctional group, $x=0.01$ to $0.65$ and $y=0.005$ to $0.5,0$, wherein the framework structure is hexagonal or wormhole.

A further objective of the invention is to provide a supramolecular surfactant-directed assembly method for the preparation of the first examples of ultrastable organofunctional silica-alumina composition with a mesocellular foam structure through the use of aqueous solutions of silicate and aluminate. Further, the present invention provides for an organofunctional silica-alumina mesocellular foam composition with the anhydrous composition $(SiO_2)_{1-x}(LSiO_{1.5})_x(Al_2O_3)_y$, where L is one or more organofunctional group, $x=0.01$ to $0.30$ and $y=0.005$ to $0.05$.

For the purposes of this invention, an organofunctional silica composition is defined as one in which a fraction of the tetrahedral $SiO_4$ units of silica are replaced in part by one or more tetrahedral units of the form $LSiO_3$ wherein L is an organo group linked to silicon through a covalent Si—C bond. Further, mesostructured forms of organofunctional silica have an ordered open framework structure comprised of $SiO_4$ and $LSiO_3$ units that provides uniform porosity, as indicated by nitrogen adsorption-desorption isotherms. Still further, mesostructured organofunctional silica compositions exhibit a structural feature (e.g., an x-ray basal spacing, a framework pore diameter, etc.) that is repeated on a mesoscopic length scale of 2–50 nm. As is demonstrated by the examples of this invention, hexagonal, wormhole and mesocellular foam framework structures forms of mesostructured organofunctional silica compositions are produced from aqueous silicate anions as the silica source, that is, as the source of the framework $SiO_4$ units. Mesostuctured organofunctional silica-alumina compositions share analogous properties with the mesostructured organofunctional silica compositions of this invention, except that $AlO_4$ and $AlO_6$ units are added to the framework $SiO_4$ and $LSiO_3$ units of a mesostructured organofunctional silica analog. Introducing trivalent aluminum centers into the framework in place of tetravalent silicon has advantages in modifying the polarity of the organofunctional surface to enhance the adsorption of polar molecules. Such surface modification facilitates the wetting of the functional surfaces by different solvents and promote access to the organofunctional sites by polar substrates.

A key inventive step of the present invention is the use of low cost aqueous silicate solutions in place of a silicon alkoxide as the source of silica in forming the $SiO_4$ units of a mesostuctured organofunctional silica composition as described in U.S. Pat. No. 6,607,705 B1 owned by a common assignee, which is incorporated by reference herein. Sodium silicate is the preferred form of water soluble silicate anions, though the methodology presented here is not limited to sodium ions as the counter cations in the solution. Other cations, including other alkali metal cations particularly potassium, as well as organic cations such as quaternary ammonium ions can serve as the counter cation. Hydrolyzable organosilanes, preferably of the general formula $LSiY_3$, where L is the desired organofunctional group and Y is a hydrolyzable moiety, serve as the source of framework $LSiO_3$ units. The organofunctional groups L of the mesostructured organofunctional silica compositions of this invention are not limited to those containing only carbon and hydrogen. Organo groups containing one or more heteroatoms selected from the group comprising oxygen, nitrogen, sulfur, phosphorus, boron, and halogen also are included in the mesostructured $(SiO_2)_{1-x}(LSiO_{1.5})_x$ compositions.

Commercial aqueous solutions of silicate anions are normally provided as very basic aqueous solutions, the pH being far higher than the pH that will allow the supramolecular assembly of a mesostructured organofunctional mesostructure. For instance, a representative commercial sodium silicate solution formally contains 27% $SiO_2$ and 14% NaOH by weight and the pH is well above the upper pH limit (pH<11) for the formation of mesostructures. Thus, it is necessary to reduce the pH of the reaction mixture through the incorporation of a protonic acid into the reaction mixture. The pH of the reaction mixture is normally adjusted to a value in the range of about 1 to about 10, depending in part on the choice of the structure-directing, the reaction temperature, and the desired mesostructured form of the organofunctional composition. In general, pH values in the basic range up to about 10 promote the assembly of hexagonal and wormhole framework structures, whereas pH values in the acidic range down to a value of about 1.0 promotes mesocellular foam formation. Reaction temperatures in the range 0° to about 150° C. or even high are useful, but a temperature in the range 25° to about 100° C. generally is preferred in producing well-expressed mesostructured organofunctional silica compositions. In general, electrostatic supramolecular assembly pathways that incorporate an ionic surfactant as the structure director can be carried out at a reaction temperature $\leq 100°$ C. and at basic pH values below about 10. Electrically neutral supramolecular assemblies that rely on hydrogen bonding interactions between an electrically neutral surfactant and an electrically neutral framework precursor more preferably are carried out at a temperature $\leq 100°$ C.

Another key inventive step of this invention is the disclosure of a direct supramolecular assembly method for the production of mesostructured silica-alumina compositions with hexagonal, wormhole or mesocellular foam framework structures wherein the framework composition is assembled from protozeolitic aluminosilicate clusters and one or more organofunctional silane of the form $LSiY_3$ as the precursor to $LSiO_3$ units, where Y is one or more hydrolyzable moiety such as halide or alkoxide, so as to provide mesostructured materials with the anhydrous composition $(SiO_2)_{1-x}(LSiO_{1.5})_x(Al_2O_3)_y$, where L is one or more organofunctional group. The L organo groups include alkyl or aryl hydrocarbon moieties, as well as organo moieties containing one or more heteroatoms selected from the group comprising boron, oxygen, sulfur, nitrogen, phosphorus, and halogen, and combinations thereof.

For the supramolecular assembly of the mesostructured organofunctional compositions of this invention, the amount of surfactant needed per mole of silicon depends in part on the molecular weight of the surfactant and whether the surfactant is electrically charged or neutral. The approximate amount of surfactant used to form the mesostructures in most cases is on the order of 100 g per mole of total silica, but the inventors do not want to hold to any specific quantity of the surfactant because the surfactants differ substantially in structure-directing properties. Surfactants particularly useful for the assembly of the mesostructured organofunctional compositions of this invention include alkyl amines in neutral and protonated form, quaternary ammonium ions, non-ionic diblock polymers, non-ionic triblock polymers, and saccharide-based polymers. Examples of suitable non-ionic diblock copolymers include commercially available non-ionic diblock surfactants and triblock surfactants. TERGITOL surfactants such as TERGITOL 15-S-12 ($C_{15}H_{31}$(OCH$_2$CH$_2$)$_{12}$OH) and BRIJ surfactants such as BRIJ 56 ($C_{16}H_{33}$(OCH$_2$CH$_2$)$_{10}$OH) are representative diblock surfactants. Pluronic polyethylene oxide (PEO)-polypropylene oxide (PPO) are representative triblock copolymers of the type (PEO-PPO-PEO) that are suitable for use. A representative non-ionic triblock surfactant is PLURONIC 123 with the formula (PEO$_{20}$-PPO$_{70}$-PEO$_{20}$). Saccharide-based surfactants, which are derived from carbohydrates and include alkylpolyglucosides, fatty acid N-methylglucamies, and fatty acid esters of sucrose or sorbitan, are also suitable. An example of a sorbitan-based surfactant is TWEEN 80 with the formula

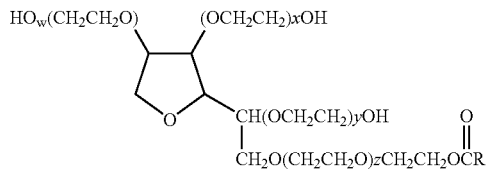

where R corresponds to $(CH_3)_7C_2H_2(CH_2)_7CH_3$ and w+x+y+z equals 20.

All of the organofunctional mesostructures disclosed in this invention in as-made form contain the structure-directing surfactant intercalated in the framework pores. The final mesostructured organofunctional compositions are obtained in surfactant-free form through solvent extraction, preferably at elevated temperatures up to the boiling point of the solvent. Alcohols are especially preferred solvents for the extraction of the intercalated surfactant from the as-made mesostructure. In the case of electrically charged surfactants, such as cetyltrimethylammonium ion, it is advantageous to include a protonic acid in the extraction solvent to facilitate the displacement of the surfactant from the framework pores by proton ion exchange.

Hexagonal and Wormhole

The mesostuctured organofunctional silica compositions described by this invention have compositions corresponding to $(SiO_2)_{1-x}(SiLO_{1.5})_x$ when written in anhydrous form, where L is one or more organo groups and x represents the fraction of framework silicon sites that are organofunctionalized. The organo group L can be a simple alkyl or aryl hydrocarbon moiety. More useful are compositions in which the organo group L contains a heteroatom selected from the group boron, oxygen, sulfur, nitrogen, phosphorus, and halogen, and combinations thereof. Mesostructured organofunctional silica compositions prepared by the method of this invention typically exhibit hexagonal and wormhole framework structures. Such framework structures have at least one low angle x-ray diffraction (XRD) peak corresponding to a basal spacing of at least 2.0 nm. Hexagonal and wormhole framework structures are readily imaged and confirmed by transmission electron microscopy (TEM). For mesostructured organofunctional compositions in which L is an aryl group, such as a phenyl group, a third framework structure type is formed with a mesocellular foam structure. Such mesocellular foam structures are discussed in greater detail below. In general, the fraction of total silicon sites that can be organofunctionalized with retention of a hexagonal or wormhole mesostructure typically is in the range 0.01 to about 0.65. At $LSiO_3$ molar fractions above about 0.65, the porosity and mesostructured framework is normally lost.

More specifically, this invention provides a method for producing a mesostructured organofunctional silica composition comprising the steps of combining a basic (pH>11) aqueous solution of silicate anions with an acidified solution of at least one hydrolyzable organosilane reagent and a surfactant to form a reaction mixture with a pH between about 1.0 and about 10 as determined through the use of HYDRION paper, aging the reaction mixture in the said pH range at a temperature between 0° and 150° C. at a surfactant to silicon ratio effective to produce a mesostructured organofunctional silica composition intercalated by the surfactant and removing the surfactant from the intercalated product by solvent extraction, the solvent optionally containing a protonic acid to facilitate surfactant removal.

Foams

The above method for the production of mesostructured organofunctional silica compositions will yield a $(SiO_2)_{1-x}(SiLO_{1.5})_x$ with a mesocellular foam structure in the special case for L=an aryl moiety such as a phenyl group. However, the present invention provides for a more universal method for producing a mesostructured organofunctional silica composition wherein the framework is a mesocellular foam, and the anhydrous composition corresponds to the formula $(SiO_2)_{1-x}(SiLO_{1.5})_x$, wherein L is one or more organo functional groups and x presents the fraction of framework silicon sites that are organofunctionalized. This method applies not only to organo derivatives in which L is an alkyl or aryl hydrocarbon, but more universally to organo groups L confining one or more heteroatoms selected from the group comprising boron, oxygen, nitrogen, sulfur, phosphorus, and halogen, and combinations thereof. More specifically, the present invention provides a method for the production of an organofunctional silica with a mesocellular foam structure and an anhydrous formula $(SiO_2)_{1-x}(SiLO_{1.5})_x$, wherein L is one or more organo groups linked to framework silicon centers through a carbon-silicon bond and x is the fraction of framework silicon centers that are organofunctionalized, comprising the steps of combining a basic (pH>11) aqueous solution of silicate anions with a solution containing a surfactant, an emulsifying agent, and at least one hydrolyzable organosilane reagent in an acidified non-aqueous polar solvent, wherein the dielectric constant of the non-aqueous solvent is greater than about 70 at 25° C., to obtain an emulsified reaction mixture with a pH between 1 to 10, allowing the reaction mixture to age at temperature between 0° and 150° C. effective to produce an organofunctional mesocellular silica foam composition intercalated by the surfactants and removing the surfactant from the intercalated product by solvent extraction, the solvent optionally containing a protonic acid to facilitate surfactant removal.

Still further, the present invention provides for a mesostructured organofunctional silica composition with the anhydrous composition $(SiO_2)_{1-x}(SiLO_{1.5})_x$, wherein L is an organofunctional group and x=0.01 to 0.30 and wherein the framework is a mesocellular foam structure. The L organo groups include alkyl or aryl hydrocarbon moieties, as well as organo moieties containing one or more hetero atoms selected from the group comprising boron, oxygen, sulfur, nitrogen, phosphorus, and halogen, and combinations thereof.

Mesoporous cellular silica foam (MCF) structures with large pore sizes (20 to 45 nm) are relatively new in the art, being templated by microemulsion of "oil in water". Silica mesocellular foam are described by Schmidt-Winkel et al in J. Am. Chem. Soc. 121 254–255 (1999) and Chem. Materials 12 686–696 (2000). According to the teachings provided by Schmidt-Winkel et al., MCF materials exhibit x-ray diffraction peaks at small scattering angles. However, the diffraction peaks cannot be indexed to any plane or space group indicative of a regular ordered structure. Instead, the x-ray peaks are consistent with the presence of cells of more or less spherical shape and size. They further teach that direct evidence for a cellular foam structure is obtained from transmission electron microscopy (TEM) images, which show a reticulate assembly of cells, connected by open windows with an average diameter smaller than the average diameter of the cells. The silica walls of the cells are described as being "strut-like".

Thus, the present invention discloses the first examples of an ultrastable organofunctional mesocellular foam structure with the anhydrous composition $(SiO_2)_{1-x}(SiLO_{1.5})_x$, where L is the desired organo group and x presents the fraction of framework silicon sites that are organofunctionalized. The organo group L may contain one or more heteroatoms selected from the group comprising boron, nitrogen, phosphorus, oxygen, sulfur, and halogen. The said compositions are assembled from an emulsion prepared from aqueous sodium silicate and a non-aqueous solution of an organosilane as the source of the organic functional group, a non-ionic surfactant, an emulsifying agent and a protonic acid to reduce the pH to a value effective in forming a mesocellular foam structure. The preferred non-aqueous solvent is formamide, but other non-aqueous solvents with a dielectric constant above about 70 at 25° C. may be used in place of formamide. Also, the preferred organosilane has a composition $LSiY_3$, where L is the desired organo group and Y is a hydrolyzable moiety such as a halogen or an alkoxide. Further, the preferred emulsifying agent is 1,3,5-trimethylbenzene but other alkylated aromatics, as well as alkanes and alkyl alcohols with a carbon number $\geq 8$ also can be used as an emulsifying agent. The preferred non-ionic surfactant is a polyethylene oxide-polypropylene oxide-polyethylene oxide triblock surfactant, abbreviated, PEO-PPO-PEO. The incorporation of $LSiO_3$ units into the framework walls of mesocellular silica foam generally decreases the intensity of the X-ray reflections, even to the point of being too weak to be readily observed. In this latter case the mesocellular foam structure is verified by transmission electron microscopy.

Silica-Alumina

The mesostructured organofunctional silica-alumina compositions of this invention have empirical formulas corresponding to $(SiO_2)_{1-x}(SiLO_{1.5})_x(Al_2O_3)_y$, when written in anhydrous form, wherein L is one or more organofunctional group, and x=0.01 to 0.65 and wherein y=0.01 to 0.50 and represents the number of $AlO_4$ and $AlO_6$ units linked to framework $SiO_4$ and $LSiO_3$ units of the mesostructured organofunctional silica analogs. As in the case of organofunctional mesostructured silicas, these silica-alumina analogs normally form hexagonal and wormhole framework structures that exhibit at least one low angle x-ray diffraction (XRD) peak corresponding to a basal spacing of at least 2.0 nm. Also, in addition including a simple alkyl or aryl hydrocarbon moiety, the L organo group includes moieties with one or more heteroatoms selected from the group consisting of boron, oxygen, sulfur, nitrogen, phosphorus, and halogen.

More specifically, this invention provides a method for the production of a mesostructured organofunctional silica-alumina composition comprising the steps of combining a basic (pH>11) aqueous solution of silicate and aluminate ions, hydroxide ions as a base, zeolite-directing counter cations, and at least one hydrolyzable organosilane reagent, aging the solution at or above ambient temperature for a period effective to produce protozeolitic aluminosilicate clusters in solution, reducing the pH of the mixture to a value of 10 or below through the incorporation of an acid, adding a surfactant to form a reaction mixture, aging the reaction mixture at a pH between about 1.0 and about 10 at a temperature between 0° and 150° C. at a surfactant to silicon ratio effective to produce a mesostructured organofunctional silica-alumina composition intercalated by the surfactant and removing the surfactant from the intercalated product by solvent extraction, the solvent optionally containing a protonic acid to facilitate surfactant removal.

The step involving protozeolitic aluminosilicate cluster formation is important because it provides a more stable mesostructured framework in comparison to the compositions made from conventional mixtures of silicate ions and aluminate ions. U.S. Pat. No. 6,585,952 to Pinnavaia et al, owned by a common assignee, which is incorporated by reference herein, has taught that aluminosilicate mesostructures prepared from protozeolitic clusters exhibit greater hydrothermal stability than analogous composition formed from conventional aluminate and silicate precursors. The same principal applies to the current art for the assembly of organofunctional silica-alumina mesostructure compositions. The key to forming stable protozeolitic aluminosilicate clusters is to incorporate a cationic zeolite structure director in the aging of the silicate and aluminate solutions when forming the clusters. Cationic zeolite structure directors include a wide range of alkali metal cations and organic ammonium cations as taught by the prior art of Pinnavaia et al in U.S. Pat. No. 6,585,952. The sodium ion is a structure director for several zeolite structure types including zeolites Type A, Type X and Type Y. Protozeolitic clusters that nucleate other zeolites such as zeolite ZSM-5 and zeolite beta also are useful. The organic quaternary ammonium ions needed to nucleate nanoclustered precursors to zeolite ZSM-5 and zeolite beta, among other zeolites, may be introduced into the reaction mixtures of this invention by incorporating these cations as counter cations of the silicate aluminate and hydroxide ions in the reaction mixture.

The present invention discloses a supramolecular assembly method for producing a mesocellular foam composition with the anhydrous empirical formula $(SiO_2)_{1-x}(SiLO_{1.5})_x$ $(Al_2O_3)_y$, where L represents one or more organofunctional groups, x=0.01 to 0.30, and y=0.005 to 0.05 comprising the steps of forming a basic aluminosilicate solution from silicate anions, aluminate anions, and a zeolite-directing counter-cation in the minimum amount of water, aging the solution at a temperature effective to form protozeolitic seeds in the solution, adding an organosilane reagent as a source of $LSiO_3$ units, aging the solution further to incorporate the $LSiO_3$ units into the protozeolitic nanoclusters, combining the resulting solution with an emulsion containing a surfactant, an emulsifying agent, and sulfuric acid effective in neutralizing the formal hydroxide ion content of the protozeolitic aluminosilicate solution to form a reaction mixture, lowering the pH of the reaction mixture to a value between about 1.0 and about 5.5, aging the reaction at a temperature between 0° to 150° C. for a period of time effective to form a mesocellular foam structure intercalated by the surfactant and emulsifying agent, and removing the surfactant and emulsifying agent by solvent extraction.

The preferred surfactant is a non-ionic ethylene oxide-propylene oxide triblock surfactant of the type PEO-PPO-PEO. An especially preferred triblock surfactant is PLURONIC 123. The preferred zeolite-directing counter cations used to form the protozeolitic aluminosilicate nanoclusters are selected from the group comprising alkali metal ions and quaternary ammonium ions. The preferred organosilane for use as a precursor to the $LSiO_3$ framework units has the form $LSiY_3$, wherein Y is a hydrolyzable moiety, most preferably a halide or alkoxide moiety and L is the desired organo group bonded to silicon through a carbon silicon bond. The preferred emulsifying agent is selected from the group comprising trialkylated benzenes and alkanes and alkyl alcohols containing eight or more carbon atoms. 1,3,5-trimethylbenzene is an especially preferred emulsifying agent.

EXAMPLES

Examples 1 to 25

The examples illustrate a general method for the supramolecular assembly of an organofunctional silica mesostructure with the anhydrous composition $(SiO_2)_{1-x}(SiLO_{1.5})_x$ from sodium silicate, an organosilane of the type $LSiY_3$ as the source of the organo group, where L is the desired organo group, and Y is a hydrolyzable group such as a halide or alkoxide, most preferably methoxide or ethoxide, and a surfactant as the structure director. The specific surfactant selected for this example was the non-ionic surfactant BRIJ 56, which contains a $C_{16}$ alkyl chain linked to a block of 10 ethylene oxide units.

A 0.14 molar quantity of diblock co-polymer surfactant, BRIJ 56, was dissolved in a mixture of 0.8 moles of acetic acid and 3.4 moles of ethanol. The reaction mixture was stirred on a shaker until the dissolution of the surfactant. Following the dissolution of the surfactant an appropriate molar quantity (x moles) of a $LSiY_3$ organosilane reagent, where L is the desired organo group and Y is a hydrolyzable group, most preferably methoxide or ethoxide was added (see Table 1) and the reaction mixture stirred for 1 hr at room temperature.

TABLE 1

| Example No. | L | X | Framework Structure | d spacing (nm) | SA ($m^2$/g) | Pore Vol $cm^3$/g | Pore Size (nm) |
|---|---|---|---|---|---|---|---|
| 1 | $(CH_2)_2CN$ | 0.05 | Hexagonal | 5.8 | 992 | 1.05 | 3.7 |
| 2 | $(CH_2)_2CN$ | 0.10 | Hexagonal | 5.8 | 1082 | 1.15 | 3.6 |
| 3 | $(CH_2)_2CN$ | 0.15 | Hexagonal | 5.9 | 1041 | 1.06 | 3.5 |
| 4 | $(CH_2)_2CN$ | 0.20 | Hexagonal | 5.9 | 1061 | 0.99 | 3.7 |
| 5 | $(CH_2)_2CN$ | 0.25 | Hexagonal | 5.9 | 1043 | 1.02 | 3.6 |
| 6 | $(CH_2)_2CN$ | 0.30 | Hexagonal/Wormhole | 6.0 | 986 | 0.94 | 3.5 |
| 7 | $(CH_2)_2CN$ | 0.50 | Hexagonal/Wormhole | — | 590 | 0.67 | 3.5 |
| 8 | $CH_2)_3SH$ | 0.05 | Hexagonal | 5.7 | 1079 | 1.04 | 3.7 |
| 9 | $CH_2)_3SH$ | 0.10 | Hexagonal | 5.7 | 1118 | 1.02 | 3.5 |
| 10 | $CH_2)_3SH$ | 0.15 | Hexagonal | 5.8 | 1021 | 0.82 | 3.0 |
| 11 | $CH_2)_3SH$ | 0.20 | Hexagonal/Wormhole | 5.0 | 936 | 0.72 | 2.9 |
| 12 | $CH_2)_3SH$ | 0.25 | Hexagonal/Wormhole | 6.2 | 775 | 0.53 | 2.5 |
| 13 | $C_6H_5$ | 0.05 | Hexagonal | 6.0 | 1084 | 1.14 | 4.0 |
| 14 | $C_6H_5$ | 0.10 | Foam like | 7.3 | 1190 | 1.15 | 4.8 |
| 15 | $C_6H_5$ | 0.15 | Foam like | 8.1 | 1145 | 1.07 | 5.6 |
| 16 | $C_6H_5$ | 0.20 | Foam like | 9.0 | 1066 | 1.11 | 5.7 |
| 17 | $C_6H_5$ | 0.25 | Foam like | — | 1020 | 1.05 | 5.9 |
| 18 | $C_6H_5$ | 0.30 | Foam like | — | 983 | 1.04 | 5.8 |
| 19 | $C_6H_5$ | 0.50 | Foam like | — | 860 | 0.59 | 3.6 |
| 20 | $CH_2)_3NH_2$ | 0.05 | Wormhole | 4.2 | 682 | 0.98 | 4.4 |
| 21 | $CH_2)_3NH_2$ | 0.10 | Wormhole | 4.3 | 656 | 0.92 | 3.9 |
| 22 | $CH_2)_3NH_2$ | 0.15 | Wormhole | 6.2 | 553 | 0.71 | 3.7 |
| 23 | $CH_2)_3NH_2$ | 0.20 | Wormhole | 4.5 | 660 | 0.87 | 3.6 |
| 24 | $CH_2)_3NH_2$ | 0.25 | Wormhole | 4.5 | 582 | 0.89 | 3.5 |
| 25 | $CH_2)_3NH_2$ | 0.30 | Wormhole | — | 515 | 0.87 | 3.4 |

After an hour (1-x moles) of water-soluble sodium silicate dissolved in deionized water was added to the above reaction mixture. The composition of the sodium silicate solution was 27 wt % $SiO_2$ and 14 wt % NaOH. The resultant mixture was stirred at 60° C. for 20 hrs in a controlled temperature shaker bath. The reaction stoichiometry expressed in terms of moles per mole of $SiO_2$ corresponded to the following:

1-x $SiO_2$: 0.78 (1-x)Na(OH): 0.140 BRIJ 56: x organosilane: 0.8 Acetic Acid: 3.4 Ethanol: 134+7.3 (1-x) Water The reaction of acetic acid and the hydroxide component of the sodium silicate reagent caused the reaction mixture to be buffered near a pH of about 5.6. The resulting mixture after cooling to room temperature was filtered, washed with water and air-dried. The template was removed by Soxhlet extraction with ethanol for 24 hrs.

Survey experiments with triethoxy-silylpropionitrile as the source of the organofunctional group afforded products Examples 1 to 7 that exhibited at least one low angle diffraction line, indicative of mesostructure formation for x values up to 0.65. Above x=0.65, the products exhibited little or no low angle x-ray diffraction. Also, increasing the reaction temperature decreased the amount of time needed to form a mesostructured product, but temperatures in the range 0° to 100° C. gave better ordered products. More typically, temperatures in the range 40° to 80° C. provided the optimal mesostructured ordering.

The X-ray diffraction patterns of the samples were measured on a Rigaku Rotaflex diffractometer equipped with a rotating anode and Cu-Kα radiation (λ=0.15148 nm). The diffraction data were recorded by step scanning at 0.02 degrees at 2θ per step, where θ is the Bragg angle. Transmission electron micrographs were obtained on a JEOL JEM 100CX microscope. The specimen was sonicated in ethanol and a drop of the suspension was dropped on a carbon coated copper grid (400 mesh). The sample images were obtained using an accelerating voltage of 120 kV, a beam diameter of approximately 5 μm and an objective lens aperture of 20 μm. The single pulse mode $^{29}Si$ MAS NMR spectrum was recorded on a Varian 400 solid state NMR spectrometer at 79.5 MHz with a 7 mm zirconia rotor, a spinning frequency of 4 KHz and a pulse delay of 400 s. The pore structure of the same samples was characterized by measuring the $N_2$ adsorption-desorption isotherms on a Micromeretics ASAP sorptometer at -195° C. using standard continuous sorption procedures. Before the measurement, each sample was heated overnight at 100° C. and $10^{-6}$ Torr. The specific surface area ($S_{BET}$, $m^2/g$) and the total pore volume ($V_t$, cc/g) were determined from the isotherms following the IUPAC recommendations (Sing et al., Pure Appl. Chem. 57 603–619 (1985)). The pore size distribution of the materials was calculated using the method of Barrett-Joyner-Halenda and the Howarth Kawazoe method. The amounts of each reagent added together with the corresponding physicochemical parameters are summarized in Table 1.

Depending in part on the degree of organofunctionalization (x), the X-ray diffraction pattern of the ethanol extracted products exhibited three low angle reflections between about one and ten degrees two theta using copper K-alpha radiation, indicative of a hexagonal framework structure or at least one diffraction line in this region indicative of a wormhole framework structure. Foam structures gave no low angle XRD peaks, or, at best very weak low angle diffraction peaks. However, the foam structure was clearly evident in transmission electron micrographs.

The $N_2$ adsorption-desorption isotherms of the ethanol extracted exhibit a typical type IV adsorption isotherm. The adsorption steps at relative pressures between 0.2–0.4 signify the filling of the framework pores. The surface areas of the funtionalized materials were in the range of 1060–590 $m^2/g$. The pore volumes are in the range of 1.150–0.67 $cm^3/g$ at STP. The surface area and the pore volume decrease with the increase in the amount of added organosilane reagent. The BJH pore size distribution shows the pore size to be in the range of 37 Å. The presence of the functionalized silane in the framework of the mesoporous silica is confirmed by $^{29}Si$ MAS NMR spectra. Signals at about −110 ppm and about −100 ppm were due to the $Q^4$ and $Q^3$ environments of the $SiO_4$ units, respectively, and the signals at about −68 ppm and about −59 ppm arise from the $T^3$ and $T^2$ connectivities of the organofunctional $LSiO_3$ centers, respectively, where L is the desired organo group. The intensity of the T bands increased as the amount of incorporated organosilane increased.

The above experimental procedures were carried out with different functional groups containing various heteroatoms, as well as with different surfactants (see below), to demonstrate that the process was general and could be used for the incorporation of virtually any desired organofunctional group. The functional groups used included propylnitrile, phenyl, 3-mercaptopropyl, and aminopropyl. The reaction stoichiometry was kept constant except for the change in the organosilane reagent used. The physical properties of the different funtionalized materials prepared using BRIJ 56 as a structure director are summarized in Table 1.

Examples 26 to 44

The following examples demonstrate that the synthesis strategy of Examples 1 to 25 also applies to reaction systems in which the surfactant is an alkyl-PEO/Furan (sorbitan) surfactant such as TWEEN 80 instead of the diblock copolymer surfactant BRIJ 56. The synthesis method was equivalent to the method of example 1. The reaction stoichiometry was 1-x $SiO_2$: 0.78(1-x)Na(OH): 0.073 TWEEN 80: x organosilane: 0.8 Acetic acid: 3.4 Ethanol: 134+ 7.3 (1-x) Water The reaction temperature and time was 60° C. and 20 hr, respectively.

The physical characteristics of the functionalized mesostructured materials are presented in Table 2.

TABLE 2

| Example No. | L | X | Structure | d spacing (nm) | SA $M^2/g$ | Pore Vol ($cm^3/g$) | Pore Size (nm) |
| --- | --- | --- | --- | --- | --- | --- | --- |
| 26 | $(CH_2)_2CN$ | 0.05 | Wormhole | 6.7 | 998 | 1.14 | 4.0 |
| 27 | $(CH_2)_2CN$ | 0.10 | Wormhole | 7.2 | 921 | 1.11 | 4.4 |
| 28 | $(CH_2)_2CN$ | 0.15 | Wormhole | 7.4 | 1000 | 1.18 | 4.8 |
| 29 | $(CH_2)_2CN$ | 0.20 | Wormhole | 7.7 | 879 | 0.93 | 4.5 |
| 30 | $(CH_2)_2CN$ | 0.25 | Wormhole | 8.0 | 843 | 0.90 | 4.5 |
| 31 | $(CH_2)_2CN$ | 0.30 | Wormhole | — | 827 | 0.92 | 4.8 |
| 32 | $(CH_2)_2CN$ | 0.50 | Wormhole | — | 527 | 0.74 | 5.5 |
| 33 | $(CH_2)_3SH$ | 0.05 | Wormhole | 6.7 | 1079 | 1.04 | 3.7 |
| 34 | $(CH_2)_3SH$ | 0.10 | Wormhole | 6.9 | 1118 | 1.02 | 3.5 |
| 35 | $(CH_2)_3SH$ | 0.15 | Wormhole | 6.9 | 1021 | 0.82 | 3.0 |
| 36 | $(CH_2)_3SH$ | 0.20 | Wormhole | 7.1 | 936 | 0.72 | 2.9 |
| 37 | $(CH_2)_3SH$ | 0.25 | Wormhole | 7.1 | 775 | 0.53 | 2.5 |
| 38 | $C_6H_5$ | 0.05 | Wormhole | — | 1034 | 1.11 | 4.4 |
| 39 | $C_6H_5$ | 0.10 | Foam like | — | 1060 | 1.10 | 5.6 |
| 40 | $C_6H_5$ | 0.15 | Foam like | — | 1043 | 1.18 | 6.6 |
| 41 | $C_6H_5$ | 0.20 | Foam like | — | 1043 | 1.28 | 6.9 |
| 42 | $C_6H_5$ | 0.25 | Foam like | — | 800 | 0.95 | 6.9 |
| 43 | $C_6H_5$ | 0.30 | Foam like | — | 861 | 1.09 | 6.9 |
| 44 | $C_6H_5$ | 0.50 | Foam like | — | 663 | 0.93 | 6.9 |

These results indicate that the synthesis procedure is general and applicable to other surfactant compositions for the direct assembly of organofunctional mesostructured materials using cost effective sodium silicate as the silica source.

Examples 45 to 50

The following examples demonstrate that the supramolecular synthesis procedure of Examples 1 to 25 also was applicable to amine surfactants in a one-step direct assembly process with sodium silicate as the silica source. The surfactant used was dodecylamine (DDA) and the organosilane reagent used was mercaptopropyltrimethoxy silane (MPTMS). The reaction stoichiometry expressed in terms of moles per mole of $SiO_2$ corresponded to the following:

1-x $SiO_2$: 0.78(1-x)Na(OH): 0.252 DDA: x Organosilane: 0.8 Acetic acid: 3.4 Ethanol: 134+7.3 (1-x) Water.

The reaction temperature and time were 25° C. and 20 hr., respectively.

The sample shows an X-ray pattern that is typical for a wormhole motif mesostructures featuring a single pore-pore correlation reflection at 2Θ angle usually between 1° and 3°. The $N_2$ adsorption-desorption isotherm obtained is a type IV isotherm with adsorption steps at partial pressures between 0.4–0.6. The pore size for the sample was about 25 Å and was calculated using the HK method. The typical properties are summarized in Table 3.

TABLE 3

| Example No. | L | x | Structure | $d_{100}$ (nm) | SA ($m^2$/g) | PV ($cm^3$/g) | Pore size (nm) |
|---|---|---|---|---|---|---|---|
| 45 | $(CH_2)_3SH$ | 0.05 | Wormhole | 4.4 | 969 | 0.76 | 2.3 |
| 46 | $(CH_2)_3SH$ | 0.10 | Wormhole | 4.6 | 851 | 0.69 | 2.5 |
| 47 | $(CH_2)_3SH$ | 0.15 | Wormhole | 4.9 | 821 | 0.60 | <2.0 |
| 48 | $(CH_2)_3SH$ | 0.20 | Wormhole | 5.0 | 806 | 0.59 | <2.0 |
| 49 | $(CH_2)_3SH$ | 0.25 | Wormhole | 5.2 | 689 | 0.49 | <2.0 |
| 50 | $(CH_2)_3SH$ | 0.30 | Wormhole | 5.2 | 581 | 0.40 | <2.0 |

Examples 51 to 53

The following examples show that the general procedure of Example 1 is applicable to a non-ionic PEO-PPO-PEO triblock surfactant like PLURONIC 123 as a structure director the synthesis procedure was analogous to the procedure in Example 1. Mercaptopropyltrimethoxysilane was the source of the organofunctional group. The reaction stoichiometry expressed in terms of moles per mole of $SiO_2$ corresponded to the following:

1-x $SiO_2$: 0.78(1-x) Na(OH): 0.06 P123: x organosilane: 0.8 Acetic acid: 3.4 Ethanol: 134+7.3 (1-x) Water The resultant mixture was stirred at 60° C. for 20 hrs in a controlled temperature shaker bath. Following this the reaction mixture was transferred to an oven at 100° C. for 24 hrs. Table 4 provides the physical properties of representative products.

TABLE 4

| Example No. | L | x | Structure | $d_{100}$ (nm) | SA ($m^2$/g) | PV ($cm^3$/g) | Pore size (nm) |
|---|---|---|---|---|---|---|---|
| 51 | $(CH_2)_3SH$ | 0.02 | Hexagonal | 11.1 | 440 | 1.08 | 10.2 |
| 52 | $(CH_2)_3SH$ | 0.05 | Hexagonal | 11.3 | 473 | 0.984 | 9.4 |
| 53 | $(CH_2)_3SH$ | 0.10 | Hexagonal | 12.6 | 510 | 0.938 | 8.4 |

Examples 54 to 56

These Examples provide a general method for the preparation of organo functional silica with a mesocellular foam structure and the anhydrous composition $(SiO_2)_{1-x}(SiLO_{1.5})_x$ from sodium silicate, an organosilane as the source of the organic functional group and a surfactant as the structure director and a co-surfactant (1,3,5-trimethylbenzene) as an emulsion promoter. This methodology incorporates the use of a polar solvent other than water as a means of achieving reactant miscibility and regulating the rate of foam structure formation. The overall reaction stoichiometry was as follows:

1-x $SiO_2$: x organosilane: 0.78 (1-x) NaOH: 0.06 P123 surfactant: 0.8 acetic acid: 20 formamide: 0.6 TMB: 134+7.3 (1-x) Water The synthesis procedure was as follows: PLURONIC P123 surfactant was dissolved in a mixture of concentrated acetic acid and formamide. Following the dissolution of the surfactant, trimethylbenzene (TMB) was added and the mixture was stirred for 1 hr. Then the organosilane reagent was added and the mixture was stirred for an additional 1 hr. Next, the aqueous sodium silicate solution was added to form an emulsified reaction mixture which was stirred at room temperature for 20 hrs and then subjected to hydrothermal treatment at 100° C. for 24 hrs in an oven. The product was then filtered, dried in air and ethanol extracted to remove the surfactant. As the samples exhibited little or no Bragg x-ray scattering at small angles, the foam framework structure was identified by TEM. The properties of representative products are given in Table 5.

TABLE 5

| Ex. No. | L | X | Structure | SA $m^2$/g | PV $cm^3$/g | Pore Size BJH Adsorption (num) Framework | Textural | Pore Size BJH Desorption (nm) |
|---|---|---|---|---|---|---|---|---|
| 54 | $(CH_2)_3SH$ | 0.02 | Foam | 334 | 1.7 | 18 | 56 | 11 |
| 55 | $(CH_2)_3SH$ | 0.05 | Foam | 460 | 1.8 | 17 | 53 | 12 |
| 56 | $(CH_2)_3SH$ | 0.10 | Foam | 455 | 1.6 | 14 | 49 | 7.8 |

Examples 57 to 60

These examples illustrate a general method for the preparation of an organofunctional silica-alumina composition with a hexagonal or wormhole framework structure. A quantity of sodium aluminate and sodium hydroxide in the molar ratio of about 1:1 was dissolved in the minimum amount of water and was stirred rapidly to obtain a clear solution. This was followed by the addition of $SiO_2$ in the form of sodium silicate and the mixture was stirred vigorously for 1 hr. The mixture was aged overnight at room temperature under static conditions and then further aged in an oven at 90° C. for 18 hrs to form protozeolitic seeds of a faujasitic zeolite. To protozeolitic seeds solution was added the organosilane (3-triethoxysilylpropionitrile) and the mixture stirred for 30 mins. The reaction mixture was then stirred overnight in a shaker bath at 60° C. This was then followed by stepwise neutralization (62.5%) of the formal sodium hydroxide content of the mixture with concentrated sulfuric acid. Then the surfactant cetyltrimethylammonium bromide in water was added and the mixture was stirred for 30 mins. The reaction mixture was again heated in an oven at 90° C. for 18 hrs. Then, an additional 12.5% of the total sodium hydroxide was neutralized with sulfuric acid and again the reaction mixture heated in an oven at 90° C. for 18 hrs to achieve a final pH near 9.0. The resulting product was then filtered and washed with water and air-dried. The surfactant was removed by refluxing in a solution of 1.0 molar HCl in methanol solution for 6 hrs. The reaction stoichiometry was as follows:

1-x $SiO_2$: x organosilane: 0.865 NaOH: 0.10 sodium aluminate: 0.205 CTAB: 0.33 Sulfuric acid: 144+7.3 (1-x) water.

The properties of representative compositions prepared by this procedure are given in Table 6.

TABLE 6

| Example No. | X | Structure | Surface Area ($m^2/g$) | Pore Vol ($cm^3/g$) | Pore Size (nm) | $d_{100}$ (nm) |
|---|---|---|---|---|---|---|
| 57 | 0.02 | Hexagonal | 807 | 0.93 | 4.6 | 4.1 |
| 58 | 0.05 | Hexagonal | 709 | 0.74 | 4.1 | 4.2 |
| 59 | 0.07 | Hexagonal | 834 | 0.88 | 4.2 | 4.2 |
| 60 | 0.10 | Hexagonal | 870 | 0.89 | 4.1 | 4.2 |

XRD powder patterns indicated the mesostructured products to have hexagonal framework symmetry up to at least x=0.10.

Example 61

This example illustrates a general method for the preparation of organofunctional silica-alumina composition with a mesocellular foam framework structure. Sodium aluminate and sodium hydroxide in about a 1:1 molar ratio was dissolved in the minimum amount of water to obtain a clear solution. Sodium silicate was then added and the mixture was stirred vigorously for 1 hr. This mixture was left overnight at room temperature under static conditions to initiate the nucleation of protozeolitic nanoclusters of a faujasitic zeolite. The mixture was then aged in an oven at 90° C. for 18 hrs to advance the formation of protozeolitic nanoclusters. This zeolite seeds solution was then diluted by the addition of additional sodium silicate so that the ratio of silica to alumina was equal to or less than one. To this solution was added the desired $LSiY_3$ organosilane wherein Y is a hydrolyzable group (e.g., as in 3-triethoxysilylpropionitrile) and the mixture was stirred for 30 min. The mixture was then aged overnight in a shaker bath at 60° C. to incorporate the organosilane moiety into the aluminosilicate protozeolitic nanoclusters. An emulsion of a triblock PEO-PPO-PEO surfactant (namely, PLURONIC 123) and an emulsifying agent (namely, 1,3,5-trimethyl benzene) was prepared and the emulsion was acidified by the addition of sulfuric acid equivalent to the formal hydroxide ion content of the organofunctional aluminosilicate seeds solution. The organofunctional protozeolitic aluminosilicate solution and the acidic emulsion were mixed and the pH was adjusted to a value below 5.5 with 1:3 $H_2SO_4$:$H_2O$ (v/v). (V/V) was then added to this surfactant emulsion solution as indicated by HYDRION paper. The reaction mixture was then aged at room temperature to 65° C. for one day followed by hydrothermal treatment at 100° C. for 24 hrs. The resulting mesocellular foam product was then filtered and washed with water and air-dried. The surfactant was removed by refluxing in a solution of ethanol for 6 hrs. The overall reaction stoichiometry was as follows:

1-x $SiO_2$: x organosilane: 0.865 NaOH: 0.10 sodium aluminate: 0.012 PLURONIC 123 surfactant: 0.50 TMB: 0.38 sulfuric acid: 110+7.3 (1-x) water.

The mesocellular foam framework was evident from the TEM images.

It is intended that the foregoing description be only illustrative of the present invention and that the present invention be limited only by the hereinafter appended claims.

We claim:

1. A process for producing a mesostructured organofunctional silica composition with framework silicon centers with an anhydrous formula $(SiO_2)_{1-x}(SiLO_{1.5})_x$, wherein L is one or more organo groups linked to the framework silicon centers through a carbon-silicon bond and x is a fraction of the framework silicon centers that are organofunctional, the process comprising the steps of combining a basic aqueous solution of silicate anions at a pH of about 11 or above with an acidified solution of at least one hydrolyzable organosilane reagent and a surfactant to form a reaction mixture with a pH between about 1.0 and about 10, aging the reaction mixture at a temperature between 0° and 150° C. at a surfactant to silicon ratio effective to produce a mesostructured organofunctional silica composition intercalated by the surfactant and removing the surfactant from the intercalated product by solvent extraction.

2. The process of claim 1 wherein the hydrolyzable organosilane reagent used to produce the mesostuctured organofunctional silica composition has the formula $LSiY_3$, wherein L is the organofunctional group and Y is a hydrolyzable moiety selected from the group consisting of halides and alkoxides.

3. The process of claim 1 wherein the organofunctional group of the mesostructured organofunctional silica composition contains one or more heteroatoms selected from the group consisting of oxygen, nitrogen, sulfur, phosphorous, boron, a halogen and combinations thereof.

4. The process of claim 1 wherein the anhydrous formula $(SiO_2)_{1-x}(LSiO_{1.5})_x$ for the mesostructured organofunctional silica composition has a value of x=0.01 to 0.65, corresponding to the fraction of framework silicon centers linked through carbon-silicon covalent bonds to one or more organo groups.

5. The process of claim 1 wherein the mesostructured organofunctional silica composition has a hexagonal, wormhole, or mesocellular foam framework structure.

6. The process of claim 1 wherein the solvent used to extract the intercalated surfactant is an alcohol, which can optionally contain a protonic acid.

7. The process of claim 1 wherein the surfactant is selected from the group consisting of an alkyl amine, a cationic quaternary ammonium ion, a non-ionic diblock polymer, a non-ionic triblock polymer, and a saccharide-based polymer.

8. A process for the production of an organofunctional silica with a mesocellular foam structure with framework silicon centers and an anhydrous formula $(SiO_2)_{1-x}(LSiO_{1.5})_x$, wherein L represents one or more organo groups linked to the framework silicon centers through a carbon-silicon bond and x is a fraction of the framework silicon centers that are organofunctional, the process comprising the steps of combining a basic aqueous solution of silicate anions at a pH of about 11 or above with a solution containing a surfactant, an emulsifying agent, and at least one hydrolyzable organosilane reagent in an acidified non-aqueous polar solvent, wherein the dielectric constant of the non-aqueous solvent is greater than about 70 at 25° C., to obtain a reaction mixture as an emulsion with a pH between 1 to 10, allowing the reaction mixture to age at temperature between 0° and 150° C. effective to produce an organofunctional mesocellular silica foam composition intercalated by the surfactant, and removing the surfactant from the intercalated product by solvent extraction.

9. The process of claim 8 wherein the hydrolyzable organosilane reagent used to produce the organofunctional mesocellular foam silica composition has the formula $LSiY_3$ where L is the organofunctional group and Y is a hydrolyzable moiety selected from the group consisting of halide and alkoxide.

10. The process of claim 8 wherein the organofunctional group of the organofunctional mesocellular silica foam composition contains one or more heteroatoms selected from the group consisting of oxygen, nitrogen, sulfur, phosphorus, boron, a halogen, and combinations thereof.

11. The process of claim 8 wherein the anhydrous formula $(SiO_2)_{1-x}(LSiO_{1.5})_x$ for the organofunctional mesocellular silica foam composition has a value of x=0.01 to 0.30, corresponding to the fraction of the framework silicon centers linked through carbon-silicon coavalent bonds to one or more organo groups.

12. The process of claim 8 wherein the solvent used to extract the intercalated surfactant is an alcohol which can optionally contain a protonic acid.

13. The process of claim 8 wherein the surfactant is selected from the group consisting of a non-ionic diblock polymer, a non-ionic triblock polymer, and a saccharide-based polymer.

14. The process of claim 8 wherein the emulsifying agent is 1,3,5-trimethylbenzene.

15. The process of claim 8 wherein the emulsifying agent is selected from the group consisting of mono- and poly-alkylated benzenes and alcohols with 8 or more carbon atoms.

16. The process of claim 8 wherein the non-aqueous polar solvent is formamide, which can optionally contain an acid.

17. A process for the production of a mesostructured organofunctional silica-alumina composition with framework silicon centers with an anhydrous formula $(SiO_2)_{1-x}(LSiO_{1.5})_x(Al_2O_3)_y$, wherein L represents one or more organo groups linked to the framework silicon centers through a carbon-silicon bond, x is the fraction of framework silicon centers that are organofunctional, and y is the moles of $Al_2O_3$ in the formula having $AlO_4$ and $AlO_6$ units that are linked to framework $SiO_4$ and $LSiO_3$ units, the process comprising the steps of combining a basic aqueous solution of silicate and aluminate ions, hydroxide ions as a base at a pH of about 11 or above, zeolite-directing counter cations, and at least one hydrolyzable organosilane reagent, aging the solution at or above ambient temperature for a period effective to produce protozeolitic aluminosilicate clusters in solution, reducing the pH of the mixture to a value of 10 or below through the addition of an acid, adding a surfactant to form a reaction mixture, aging the reaction mixture at a pH between about 1.0 and about 10 at a temperature between 0° and 150° C. at a surfactant to silicon ratio effective to produce a mesostructured organofunctional silica-alumina composition intercalated by the surfactant and removing the surfactant from the intercalated product by solvent extraction.

18. The process of claim 17 wherein the hydrolyzable organosilane reagent used to produce the mesostructured organo silica-alumina composition has the formula $LSiY_3$, wherein L is the organofunctional group and Y is a hydrolyzable moiety selected from the group consisting of halide and alkoxide.

19. The process of claim 17 wherein the mesostructured organofunctional silica-alumina composition has the anhydrous empirical formula $(SiO_2)_{1-x}(LSiO_{1.5})_x(Al_2O_3)_y$, where L is one or more organofunctional groups linked to the framework silicon centers through a carbon-silicon covalent bond, x=0.01 to 0.65 and y=0.005 to 0.50.

20. The process of claim 17 wherein the organofunctional group L of the mesostructured organofunctional silica-alumina composition contains one or more heteroatoms selected from the group consisting of oxygen, nitrogen, sulfur, phosphorus, boron, a halogen, and combinations thereof.

21. The process of claim 17 wherein the framework structure of the mesostructured organofunctional silica-alumina composition is hexagonal or wormhole.

22. The process of claim 17 wherein the solvent used to extract the intercalated surfactant is an alcohol which optionally contains a protonic acid.

23. The process of claim 17 wherein the surfactant used to produce the mesostructured organofunctional silica-alumina composition is selected from the group consisting of an alkyl amine, a cationic quaternary ammonium ion, a non-ionic diblock polymer, a non-ionic triblock polymer, and a saccharide-based polymer.

24. A process for producing an organofunctional mesocellular silica-alumina foam composition with framework silicon centers with an anhydrous empirical formula $(SiO_2)_{1-x}(LSiO_{1.5})_x(Al_2O_3)_y$, wherein L represents one or more organofunctional groups linked to the framework silicon centers through a carbon-silicon covalent bond and wherein x=0.01 to 0.30, and y=0.005 to 0.5, the process comprising the steps of forming a basic aluminosilicate solution at a pH of about 11 or above from silicate anions, aluminate anions, and a zeolite-directing counter-cation in the minimum amount of water, aging the solution at a temperature effective to form protozeolitic nanoclusters in the solution, adding an organosilane reagent as a source of $LSiO_3$ units, aging the solution further to incorporate the $LSiO_3$ units into the protozeolitic nanoclusters, combining the resulting solution with an emulsion containing a surfactant, an emulsifying agent, and sulfuric acid to form a reaction mixture, lowering the pH of the reaction mixture to a value between about 1.0 and about 5.5, aging the reaction at a temperature between 0° to 150° C. for a period of time effective to form a mesocellular foam structure intercalated by the surfactant and emulsifying agent, and removing the surfactant and emulsifying agent by solvent extraction.

25. The process of claim 24 wherein the organofunctional group L of the mesocellular silica-alumina foam composition contains one or more heteroatoms selected from the group consisting of oxygen, nitrogen, sulfur, phosphorus, boron, a halogen and combinations thereof.

26. The process of claim 24 wherein the surfactant is a non-ionic ethylene oxide-propylene oxide triblock surfactant of the type PEO-PPO-PEO.

27. The process of claim 24 wherein the surfactant is a triblock surfactant of the formula $PEO_{20}PPO_{70}PEO_{20}$, wherein PEO is ethylene oxide and PPO is propylene oxide.

28. The process of claim 24 wherein the zeolite-directing counter cation used to form the protozeolitic aluminosilicate nanoclusters is selected from the group consisting of alkali metal ions and quaternary ammonium ions.

29. The process of claim 24 wherein the zeolite directing counter cation used to form the protozeolitic aluminosilicate nanoclusters is sodium.

30. The process of claim 24 wherein the organosilane for use as a precursor to the $LSiO_3$ framework units has the formula $LSiY_3$, wherein Y is a hydrolyzable moiety selected from the group consisting of a halide and alkoxide moiety and L is the organofunctional group bonded to silicon through a carbon silicon bond.

31. The process of claim 24 wherein the emulsifying agent is selected from the group consisting of trialkylated benzenes, alkanes, and alkyl alcohols containing eight or more carbon atoms.

32. The process of claim 24 wherein 1,3,5-trimethylbenzene is the emulsifying agent.

33. An organofunctional silica composition with a mesocellular foam framework structure and an anhydrous formula $(SiO_2)_{1-x}(LSiO_{1.5})_x$, wherein L represents one or more organo groups linked to framework silicon centers through a carbon-silicon bond and wherein x=0.01 to 0.30 is a fraction of framework silicon centers that are organofunctional.

34. A mesostructured organofunctional silica-alumina composition with framework silicon centers with an anhydrous formula $(SiO_2)_{1-x}(LSiO_{1.5})_x(Al_2O_3)_y$, wherein L represents one or more organo groups linked to the framework silicon centers through a carbon-silicon bond, x=0.01 to 0.65 is the fraction of the framework silicon centers that are organofunctional, and y=0.005 to 0.50 is the mole fraction of $AlO_4$ and $AlO_6$ units that are linked to framework $SiO_4$ and $LSiO_3$ units and wherein the framework structure is hexagonal or wormhole.

35. An organofunctional mesocellular silica-alumina foam composition with framework silicon centers with an anhydrous empirical formula $(SiO_2)_{1-x}(LSiO_{1.5})_x(Al_2O_3)_y$, wherein L represents one or more organofunctional groups linked to the framework silicon centers through a carbon-silicon covalent bond and wherein x=0.01 to 0.30, and y=0.005 to 0.05.

36. The composition of any one of claims 33, 34 or 35 wherein the organo group L consists of carbon and hydrogen.

37. The compositions of any one of claims 33, 34 or 35 wherein the organo group L is comprised of carbon, hydrogen and one or more heteroatoms selected from the group consisting of boron, nitrogen, phosphorus, oxygen, sulfur, halogen and combinations thereof.

* * * * *

UNITED STATES PATENT AND TRADEMARK OFFICE
CERTIFICATE OF CORRECTION

| | |
|---|---|
| PATENT NO. | : 7,166,265 B2 |
| APPLICATION NO. | : 10/718329 |
| DATED | : January 23, 2007 |
| INVENTOR(S) | : Thomas J. Pinnavaia, Jainisha Shah and Seong-Su Kim |

It is certified that error appears in the above-identified patent and that said Letters Patent is hereby corrected as shown below:

Column 5, line 64, "y=0.005 to 0.5,0, wherein the" should be --y=0.005 to 0.50, wherein the--.

Signed and Sealed this

Twenty-first Day of August, 2007

JON W. DUDAS
*Director of the United States Patent and Trademark Office*